United States Patent [19]
Hagiwara et al.

[11] Patent Number: 5,357,159
[45] Date of Patent: Oct. 18, 1994

[54] MINIATURE MOTOR

[75] Inventors: Kenji Hagiwara; Isao Shibuya; Kazutoshi Yoshimura, all of Matsudo, Japan

[73] Assignee: Mabuchi-Motor Co., Ltd., Matsudo, Japan

[21] Appl. No.: 78,440

[22] Filed: Jun. 16, 1993

[30] Foreign Application Priority Data

Jun. 23, 1992 [JP] Japan .................................. 4-164411
Oct. 28, 1992 [JP] Japan .................................. 4-289761

[51] Int. Cl.⁵ ........................ H02K 13/10; H02K 5/12
[52] U.S. Cl. .............................. 310/40 MM; 310/220; 310/228; 310/88
[58] Field of Search ................... 310/40 MM, 88, 221, 310/220, 228; 585/12

[56] References Cited

FOREIGN PATENT DOCUMENTS 60-162449  8/1985  Japan .

Primary Examiner—Steven L. Stephan
Assistant Examiner—Clayton E. LaBalle
Attorney, Agent, or Firm—McGlew & Tuttle

[57] ABSTRACT

A miniature motor comprising a case made of a metallic material, formed into a bottomed hollow cylindrical shape and having permanent magnets on the inner circumferential surface thereof, a rotor consisting of an armature facing the permanent magnets and a commutator, and a case cap fitted to an open end of the case and having brushes making sliding contact with the commutator and input terminals electrically connected to the brushes; the rotor being rotatably supported by bearings provided on the bottom of the case and the case cap, in which an internal space defined by the case and the case cap is filled with an atmosphere of one or more than two types of polymethacrylate, polyacrylate, polyisobutylene, low molecular weight polyethylene, low molecular weight polypropylene, ethylene-propylene copolymer, polyvinyl acetate, and polybutene.

10 Claims, 1 Drawing Sheet

MINIATURE MOTOR

FIELD OF THE INVENTION

This invention relates generally to a miniature motor used for audio equipment, video equipment, precision equipment, etc., and more particularly to a miniature motor which has been improved so that stable performance can be ensured by preventing the sliding surface of the commutator from being abnormally worn by the sliding contact between the commutator and the brushes, and from polymers being formed.

BACKGROUND OF THE INVENTION

FIG. 1 is a longitudinal front view showing a typical miniature motor to which this invention is applied. In FIG. 1, reference numeral 1 refers to a case made of a metallic material, such as mild steel, formed into a bottomed hollow cylindrical shape and having permanent magnets 2 formed into an arc-segment shape fixedly fitted to the inner circumferential surface thereof. In the case 1 housed is a rotor 5 comprising an armature 3 facing the permanent magnets 2 and a commutator 4. Numeral 6 refers to a case cap made of a synthetic resin or other appropriate insulating material and formed in such a manner as to fit to an open end of the case 1. Numeral 7 refers to brush arms adapted so as to make sliding contact with the commutator 4. The brush arms 7 are housed in the case cap 6, together with input terminals 8 electrically connected to the brush arms 7. Numerals 9 and 10 refer to bearings provided on the bottom of the case 1 and the central part of the case cap 6, respectively, to rotatably support a shaft 11 constituting the rotor 5.

With the aforementioned construction, as current is fed from the input terminals 8 to the armature 3 via the brush arms 7 and the commutator 4 constituting the rotor 5, rotating force is imparted to the armature 3 existing in a magnetic field formed by the permanent magnets 2 fixedly fitted to the inner circumferential surface of the case 1, causing the rotor 5 to rotate, driving external equipment (not shown) via the shaft 11 on the output side.

In miniature motors of the conventional type having the aforementioned construction, brushes (not shown) provided on the tips of the brush arms 7 and the commutator 4 are subject to abnormal wear in a short period of time due to arc discharge, joule heat, or contact between the brushes and the commutator 4 at a sliding-contact area between the brushes and the commutator 4. If this abnormal wear occurs, electrical connection between the brushes and the commutator 4 could not be maintained, deteriorating expected stability in motor performance and reducing the service life of the miniature motor.

When a miniature motor is used in an atmosphere containing organic gases, a black-colored insulating polymer is produced on the sliding-contact area between the brushes and the commutator 4 due to arc discharge and joule heat, as mentioned above. This insulating polymer, when produced, would make the state of contact between the brushes and the commutator 4 unstable, increasing contact resistance. This would result in reduced motor life.

To solve these problems, a method of encapsulating polyvalent alcohol, etc. in a motor case to produce an atmosphere of polyvalent alcohol, etc. in the motor case has been proposed (Japanese Published Unexamined Patent Application No. Sho-60(1985)-162449, for example). Even this method, however, has not sufficient effects of extending service life in a miniature motor having such a construction as shown in FIG. 1.

SUMMARY OF THE INVENTION

It is the first object of this invention to provide a miniature motor having a function of preventing the abnormal wear of the sliding surface of the commutator and the formation of polymer.

It is the second object of this invention to provide a miniature motor which can perform stabilized performance over a long period.

DETAILED DESCRIPTION OF THE EMBODIMENTS

Figure 1:
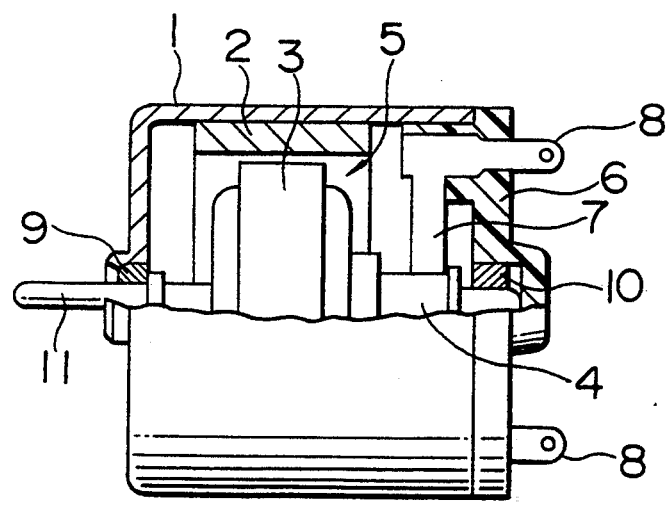
FIG. 1 is a longitudinal sectional view illustrating a typical miniature motor to which this invention is applied.
Figure 2A:
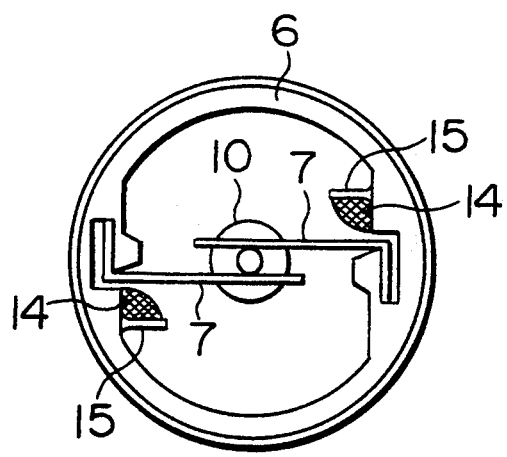
FIGS. 2A and 2B are inner end views illustrating the inside of a case cap in embodiments of this invention.
Figure 2B:
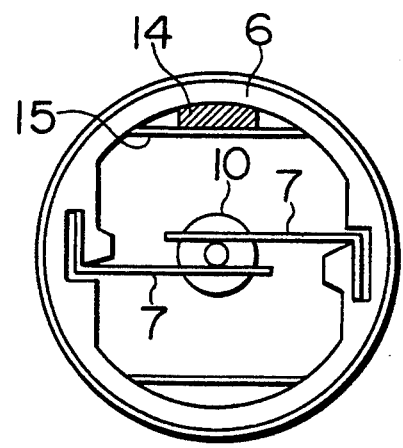

FIGS. 2A and 2B are inner end views illustrating the inside of a case cap in embodiments of this invention, respectively. Like parts are shown by like numerals used in FIG. 1. The embodiment shown in FIG. 2A is a case cap 6 having polybutene-impregnated retaining members 14 mounted via mounting members 15 provided in the vicinity of a brush arms 7 on the inner end surface of the case cap 6. The embodiment shown in FIG. 2B is a case cap 6 having polybutene-impregnated retaining members 14 mounted via mounting members 15 provided at the circumferential central part of the brush arms 7 on the inner end surface of the case cap 6.

Miniature motors having the aforementioned polybutene-impregnated retaining members 14 were subjected life tests.

As control samples, miniature motors with no atmospheric conditioning provided inside the motor, and miniature motors having an atmosphere of polyvalent alcohol (diethylene glycol, for example) inside the motor, as disclosed in the aforementioned Japanese Published Unexamined Patent Application No. Sho-60(1985)-162449, for example), were prepared.

Table 1 shows the results of life tests in which the aforementioned miniature motors having a specification of 12V, about 1.3W, 4,400 rpm were subjected to repeated cycle tests of 2-sec. stop-4-sec. clockwise revolution - 2-sec. stop-4-sec. counterclockwise revolution under a pulley load of 30 g-cm.

TABLE 1

| Atmosphere | No. | Time elapsed till shutdown (hr) | Average life (hr) |
| --- | --- | --- | --- |
| This invention | 1 | (1700) | More than 1700 |
| Polybutene | 2 | (1700) | |
| | 3 | (1700) | |
| | 4 | (1700) | |
| | 5 | (1700) | |
| Control samples (1) | 1 | 372 | 480 |
| Diethylene | 2 | 535 | |
| glycol | 3 | 490 | |
| | 4 | 535 | |
| | 5 | 471 | |
| Control samples (2) | 1 | 338 | 407 |
| Atmosphere | 2 | 362 | |
| | 3 | 374 | |
| | 4 | 471 | |

TABLE 1-continued

| Atmosphere | No. | Time elapsed till shutdown (hr) | Average life (hr) |
|---|---|---|---|
| | 5 | 530 | |

As is evident from Table 1, the control samples (2) where no atmospheric conditioning was provided inside the miniature motors involved variability in the time elapsed till motor shutdown due to the wear of the commutator, and have an extremely short average service life. In the control samples (1), average life was found extended, but only 1.2 times longer than that of the control samples (2), while there still remained variability in the time elapsed till shutdown.

The miniature motors of this invention on the other hand, were able to survive without shutdown even after 1,700 hours of continuous operation. It was confirmed, therefore, that the miniature motors of this invention has an average life more than 4 times longer than that of the control samples (2), or more than 3.5 times longer than that of the control samples (1).

Next, Table 2 shows the results of life tests in which the aforementioned miniature motors having a specification of 5V, about 0.46W, 15,000 rpm were subjected to the same repeated cycle tests as described above, with a 1Ω resistor connected in series and under a pulley load of 30 g-cm.

TABLE 2

| Atmosphere | No. | Time elapsed till shutdown (hr) | Average life (hr) |
|---|---|---|---|
| This invention | 1 | 235 | 227 |
| Polybutene | 2 | 220 | |
| | 3 | 200 | |
| | 4 | 240 | |
| | 5 | 240 | |
| Control samples (1) | 1 | 75 | 56 |
| Diethylene | 2 | 46 | |
| glycol | 3 | 62 | |
| | 4 | 39 | |
| | 5 | 58 | |
| Control samples (2) | 1 | 40 | 50 |
| Atmosphere | 2 | 40 | |
| | 3 | 48 | |
| | 4 | 62 | |
| | 5 | 62 | |

As is evident from Table 2, it was found that the miniature motors of this invention have an improved average life 4 times longer than that of the control samples (1), or more than 4.5 times longer than that of the control samples (2).

Next, miniature motors assembled after each of atmosphere-forming agents as shown in Table 3 had been inserted or infiltrated in a gap between the case 1 and the permanent magnets 2 in FIG. 1 were subjected to life tests. As control samples, miniature motors in which no atmosphere conditioning was provided, and miniature motors in which polyvalent alcohol (diethylene glycol, for example) was inserted or infiltrated in a gap between the case 1 and the permanent magnets 2, as described above, were prepared.

Table 3 shows the results of life tests in which the aforementioned miniature motors having a specification of 12V, about 1.3W, 4,400 rpm were subjected to repeated cycle tests of 2-sec. stop-4-sec. clockwise revolution - 2-sec. stop-4-sec. counterclockwise revolution, under a pulley load of 30 g-cm.

TABLE 3

| Atmosphere | No. | Time elapsed till shutdown (hr) | Average life (hr) |
|---|---|---|---|
| This invention | | (1150) | Over 1150 |
| Polymethacrylate | | (1150) | Over 1150 |
| Polyacrylate | | (1150) | Over 1150 |
| Polyisobutylene | | (1150) | Over 1150 |
| Low mol. wt. polyethylene | | (1150) | Over 1150 |
| Low mol. wt. polypropylene | | (1150) | Over 1150 |
| Ethylene-propylene copolymer | | (1150) | Over 1150 |
| Polyvinyl acetate | | (1150) | Over 1150 |
| polybutene | | (1150) | Over 1150 |
| Control samples (1) | 1 | 481 | 488 |
| Diethylene | 2 | 560 | |
| glycol | 3 | 463 | |
| | 4 | 426 | |
| | 5 | 511 | |
| Control samples (2) | 1 | 420 | 411 |
| Atmosphere | 2 | 358 | |
| | 3 | 371 | |
| | 4 | 495 | |
| | 5 | 413 | |

As is evident from Table 3, the control samples (2) where no atmospheric conditioning was provided inside the motor involved variability in the time elapsed till motor shutdown due to the wear of the commutator, and had an extremely short average life. It was found that the control samples (1) have an extended average life, but only about 1.2 times longer than that of the control samples (2), and involve variability in the time elapsed till shutdown due to wear.

The miniature motors of this invention, on the other hand, with five units each having different atmospheres were tested, were able to survive even after 1,150 hours of continuous operation. Thus, their average life is more than 2.8 times longer than that of the control samples (2), or more than 2.4 times longer than that of the control samples (1).

In this invention, an internal space defined by the case and the case cap is filled with one or more than two atmospheres of polymethacrylate, polyacrylate, polyisobutylene, low molecular weight polyethylene, low molecular weight polypropylene, ethylene-propylene copolymer, polyvinyl acetate and polybutene. In order to form an atmosphere in the aforementioned internal space, a means of infiltrating a porous material, such as absorbent wadding, felting and sponge infiltrated with one or more than two types of the aforementioned atmosphere-forming materials and disposing it at an appropriate location; or a means of impregnating or infiltrating the permanent magnets, case, armature, commutator, brushes, brush arms, case cap, bearings, bearing oil or other component member with one or more than two types of the aforementioned atmosphere-forming materials, or depositing or adsorbing one or more than two types of the atmosphere-forming materials on such component members, or blending one or more than two types of the atmosphere-forming materials with such component members; or a means of inserting one or more than two types of the atmosphere-forming materials between these component members or infiltrating these component members with one or more than two types of the atmosphere-forming materials may be used. In short, any means that can form an atmosphere of any of the aforementioned atmosphere-forming materials on the sliding-contact area between the commutator and the brushes may be used.

Polymethacrylate used in this invention may be either of a commonly used non-dispersion type having the general formula

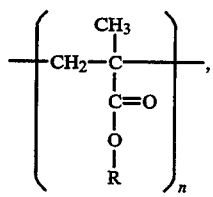

or of a dispersion type having the general formula

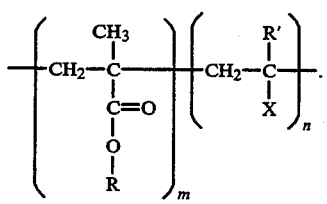

Next, polyacrylate used in this invention may be of a commonly used non-dispersion type having the general formula

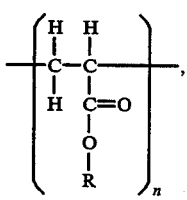

or may be of a dispersion type having the general formula

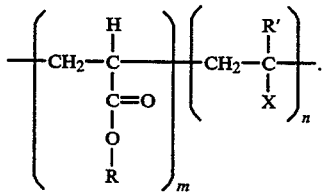

The structural formula of polyisobutylene is

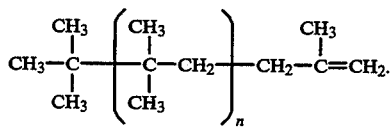

The structural formula of low molecular weight polyethylene used in this invention is

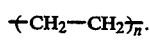

Next, the structural formula of low molecular weight polypropylene is

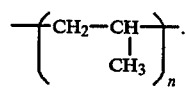

The structural formula of ethylene-propylene copolymer is

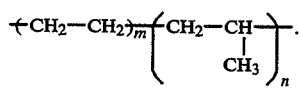

The structural formula of polyvinyl acetate used in this invention is

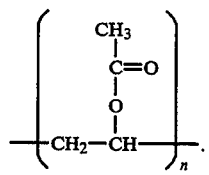

Polybutene used in this invention may be either of a general type having the general formula

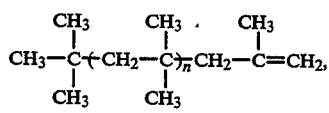

or a hydrogenated type having the general formula

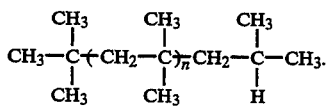

This invention having the aforementioned construction and operation can prevent the abnormal wear of the sliding-contact area between the commutator and the brushes and prevent polymer formation by the vapor gradually evaporating from atmosphere-forming materials provided in an internal space defined by the case and the case cap. The vapor then adsorbing onto surfaces inside the motor, including the commutator. The atmosphere-forming materials used in this invention are hard to decompose or oxidize at normal temperatures, stable to light and heat, and have excellent weather resistance and aging resistance. Although the atmosphere-forming materials have good dielectric properties, they form a monomolecular film-polymolecular film when adsorbed. Consequently, the atmosphere-forming materials never affect the stability of motor current waveforms or contact resistance between the commutator and the brushes due to their tunnel effect. Furthermore, this invention can prevent the initial wear of the commutator and formation of insulating polymers even in an atmosphere of an organic gas. Thus, this invention has effects of reducing and stabilizing contact resistance, stabilizing motor performance, and extend the service life of miniature motors.

What is claimed is:

1. A miniature motor comprising a case made of a metallic material, formed into a bottomed hollow cylindrical shape and having permanent magnets fixedly fitted to the inner circumferential surface thereof, a rotor consisting of an armature facing said permanent magnets and a commutator, and a case cap fitted to the open end of said case and having brushes making sliding contact with said commutator and input terminals electrically connected to said brushes; said rotor being rotatably supported by bearings provided on the bottom of said case and said case cap, an internal space defined by said case and said case cap is filled with an atmosphere including one of polymethacrylate, polyacrylate, polyisobutylene, low molecular weight polyethylene, low molecular weight polyprolylene, ehtylenepropylene copolymer, polyvinyl acetate and polybutene.

2. A miniature motor as set forth in claim 1, further comprising:
a retaining member impregnated with one of polymethacrylate, polyacrylate, polyisobutylene, low molecular weight polyethylene, low molecular weight polypropylene, ethylene-propylene copolymer, polyvinyl acetate and polybutene provided via a mounting member adjacent said brushes on an inner end surface of said case cap.

3. A miniature motor as set forth in claims (1) wherein:
said one of polymethacrylate, polyacrylate, polyisobutylene, low molecular weight polyethylene, low molecular weight polypropylene, ethylene-propylene copolymer, polyvinyl acetate and polybutene is present in one of said case, said case cap, and a component member existing in said internal space defined by said case and said case cap.

4. A miniature motor as set forth in claim (1) wherein:
said one of polymethacrylate, polyacrylate, polyisobutylene, low molecular weight polyethylene, low molecular weight polypropylene, ethylene-propylene copolymer, polyvinyl acetate and polybutene is one of inserted between and infiltrated into component members existing in said internal space defined by said case and said case cap.

5. A motor comprising:
a case:
a rotor positioned inside said case and rotatably supported inside said case;
an internal space inside said case and defined by said case and said rotor;
means for providing said internal space with a gas of one of polymethacrylate, polyacrylate, polyisobutylene, low molecular weight polyethylene, low molecular weight polypropylene, ethylene-propylene copolymer, polyvinyl acetate and polybutene.

6. A motor in accordance with claim 5, wherein:
said case includes electrical brushes;
said rotor includes a commutator in sliding electrical contact with said electrical brushes;
said gas adsorbs onto said commutator.

7. A motor in accordance with claim 5, wherein:
said gas forms a layer of molecules of said gas on said rotor.

8. A motor in accordance with claim 5, wherein:
said gas forms a monomolecular film - polymolecular film on said rotor when adsorbed, said monomolecular film - polymmolecular film having a tunnel effect which maintains a motor current waveform and contact resistance substantially stable.

9. A motor in accordance with claim 5, wherein:
said gas blocks formation of polymers when said internal space includes an organic gas.

10. A motor in accordance with claim 5, wherein:
said means for providing said gas includes impregnation means impregnated with said one of polymethacrylate, polyacrylate, polyisobutylene, low molecular weight polyethylene, low molecular weight polypropylene, ethylene-propylene copolymer, polyvinyl acetate and polybutene in a liquid form and for evaporating said one of polymethacrylate, polyacrylate, polyisobutylene, low molecular weight polyethylene, low molecular weight polypropylene, ethylene-propylene copolymer, polyvinyl acetate and polybutene into said internal space.

* * * * *